United States Patent
Agiwal et al.

(10) Patent No.: US 9,706,387 B2
(45) Date of Patent: Jul. 11, 2017

(54) METHOD FOR PERFORMING INTER PLMN DISCOVERY BY A USER EQUIPMENT (UE) IN DEVICE TO-DEVICE (D2D) COMMUNICATION

(71) Applicant: Samsung Electronics Co., Ltd, Gyeonggi-do (KR)

(72) Inventors: Anil Agiwal, Bangalore (IN); Young-Bin Chang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/794,612

(22) Filed: Jul. 8, 2015

(65) Prior Publication Data

US 2016/0014590 A1    Jan. 14, 2016

(30) Foreign Application Priority Data

Jul. 8, 2014   (IN) .......................... 3374/CHE/2014

(51) Int. Cl.
| | |
|---|---|
| *H04W 8/00* | (2009.01) |
| *H04W 52/02* | (2009.01) |
| *H04W 72/04* | (2009.01) |
| *H04W 84/04* | (2009.01) |
| *H04W 88/06* | (2009.01) |
| *H04W 48/18* | (2009.01) |

(52) U.S. Cl.
CPC ....... *H04W 8/005* (2013.01); *H04W 52/0229* (2013.01); *H04W 72/048* (2013.01); *H04W 48/18* (2013.01); *H04W 84/042* (2013.01); *H04W 88/06* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2006/0160537 A1 | 7/2006 | Buckley et al. | |
| 2013/0316727 A1* | 11/2013 | Edge | H04W 4/02 455/456.1 |
| 2014/0122607 A1* | 5/2014 | Fodor | H04W 76/023 709/204 |
| 2014/0130137 A1 | 5/2014 | Baek et al. | |

(Continued)

FOREIGN PATENT DOCUMENTS

| | | |
|---|---|---|
| WO | WO 2013/038325 A1 | 3/2013 |
| WO | WO 2013/124776 A1 | 8/2013 |

OTHER PUBLICATIONS

International Search Report dated Oct. 30, 2015 in connection with International Application PCT/KR2015/007072; 3 pages.

(Continued)

*Primary Examiner* — Diane Mizrahi (57) ABSTRACT

Embodiments herein provide a method for performing an inter Public Land Mobile Network (PLMN) discovery, by a User Equipment (UE), in Device to Device (D2D) communication. The method includes determining one or more PLMNs to monitor for receiving discovery information. Further, the method includes determining discovery resources configured in each of the one or more PLMNs. Furthermore, the method includes monitoring discovery resources configured in the one or more PLMNs to receive the discovery information.

18 Claims, 8 Drawing Sheets

(56) References Cited

U.S. PATENT DOCUMENTS

| | | | | |
|---|---|---|---|---|
| 2014/0335791 | A1* | 11/2014 | Kim | H04W 4/008 455/41.2 |
| 2015/0043448 | A1* | 2/2015 | Chatterjee | H04W 8/005 370/329 |
| 2015/0139087 | A1* | 5/2015 | Luft | H04W 52/0251 370/329 |

OTHER PUBLICATIONS

Written Opinion dated Oct. 30, 2015 in connection with International Application PCT/KR2015/007072; 7 pages.
Jongwoo Hong, et al.; "Analysis of Device-to-Device discovery and link setup in LTE networks"; Department of ECE and INMC, Seoul National University; Sep. 8-11, 2013; 6 pages.

* cited by examiner

METHOD FOR PERFORMING INTER PLMN DISCOVERY BY A USER EQUIPMENT (UE) IN DEVICE TO-DEVICE (D2D) COMMUNICATION

CROSS-REFERENCE TO RELATED APPLICATION AND CLAIM OF PRIORITY

The present application is related to and claims benefit of Indian Application Number 3374/CHE/2014 filed on 8, Jul. 2014, the disclosure of which is hereby incorporated by reference herein.

TECHNICAL FIELD

The present disclosure relates to Device to Device (D2D) communication and more particularly relates to a method and system for performing inter Public Land Mobile Network (PLMN) discovery by a User Equipment (UE) D2D communication.

BACKGROUND

In radio communication networks, such as the Long Term Evolution (LTE) or the LTE-Advanced (LTE-A) of the 3rd Generation Partnership Project (3GPP), network planning includes usage of base stations. A User Equipment (UE) may communicate with another UE through the base station(s). Alternatively, it is proposed that the UEs may communicate directly by applying resources configured by the network for a Device-to-Device (D2D) communication.

The D2D communication enables discovery and data communication services between the UEs. Discovery is a process which determines that a D2D-enabled UE is in proximity of another D2D-enabled UE. A discovering D2D-enabled UE determines whether or not another D2D-enabled UE is of interest to it using D2D discovery. A D2D-enabled UE is of interest to a discovering D2D-enabled UE if the UE's proximity needs to be known by one or more authorized applications on the discovering D2D-enabled UE. In an example, a social networking application can be enabled to use D2D discovery feature. The D2D discovery enables the D2D-enabled UE of a user of a social networking application to discover and be discoverable by the D2D-enabled UEs of his/her friends. In another example, the D2D discovery can enable the D2D-enabled UE of the user of a search application to discover stores/restaurants and so on of the user's interest in the user's proximity. The D2D enabled UE discovers other D2D-enabled UEs in the UE's proximity using direct UE-to-UE signaling.

In existing systems, the D2D communication is supported when the D2D enabled UE's are in the same PLMN, i.e., for example, the D2D enabled UE can discover another D2D enabled UE belonging to the same PLMN as that of the discovering D2D enabled UE. The D2D enabled UE cannot discover another D2D enabled UE, when another D2D enabled UE belongs to a different PLMN as that of the PLMN of the D2D enabled UE. Hence, in the existing systems, the D2D communication is only supported when both the D2D enabled UEs belong to the same PLMN.

Further, discovering another D2D enabled UE which belongs to a different PLMN as that of the D2D enabled UE is cumbersome due to following reasons as described herein. Consider a scenario, in which a D2D UE announcing the discovery signals in a cell of a PLMN X. The PLMN X can be the home PLMN or visited PLMN for the D2D UE. The D2D UE monitoring the discovery signal is in a cell of PLMN Y. The PLMN Y can be the home PLMN or visited PLMN for the monitoring D2D UE. During monitoring, the D2D UE has to monitor multiple frequencies (belonging to different PLMNs). The D2D UE monitors the frequencies of all the PLMNs which the D2D UE is authorized to monitor.

Further, the D2D UE monitors the D2D discovery signal in idle state. In order to monitor discovery signal on multiple frequencies of different PLMNs, the D2D UE's wakeup time will significantly increase. In connected state the D2D UE needs gaps to monitor the discovery signal. Also, monitoring different frequencies of different PLMNs requires more gaps which may have significant impact on the communication of the D2D UE with a serving cell of the D2D UE in the UE's PLMN.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object of the embodiments herein is to provide a mechanism for performing an inter Public Land Mobile Network (PLMN) discovery by a User Equipment (UE), in Device to Device (D2D) communication.

Another object of the embodiments herein is to provide a mechanism for providing one or more PLMNs to the UE which are to be monitored by the UE for receiving the discovery information.

Another object of the embodiments herein is to provide a mechanism for determining discovery resources configured in each PLMN of the one or more PLMNs by the UE.

Another object of the embodiments herein is to provide a mechanism for monitoring discovery resources in one or more PLMNs by the UE for receiving the discovery information.

Accordingly the embodiments herein provide a method for performing an inter Public Land Mobile Network (PLMN) discovery, by a User Equipment (UE), in Device to Device (D2D) communication. The method includes determining one or more PLMNs to monitor for receiving discovery information by the UE. Further, the method includes determining discovery resources configured in each of one or more PLMNs. Furthermore, the method includes monitoring discovery resources configured in one or more PLMNs to receive discovery information.

Accordingly the embodiments herein provide a method for performing an inter Public Land Mobile Network (PLMN) discovery, by a User Equipment (UE), in Device to Device (D2D) communication. The method includes determining one or more PLMNs to monitor for receiving discovery information by the UE. Further, the method includes determining discovery resources configured in each of one or more PLMNs. Furthermore, the method includes monitoring discovery resources configured in one or more PLMNs to receive discovery information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method for performing an inter Public Land Mobile Network (PLMN) discovery, by a User Equipment (UE), in Device to Device (D2D) communication. The method includes determining one or more PLMNs to monitor for receiving discovery information. Further, the method includes determining discovery resources configured in each of the one or more PLMNs. Furthermore, the method includes monitoring discovery resources configured in the one or more PLMNs to receive the discovery information.

Unlike, the conventional method, the proposed method allows the UE to monitor discovery information from another UE belonging to a same PLMN in which the UE is registered, or a different PLMN (inter PLMN). With the proposed method, the UE can reduce battery power consumption by monitoring the one or more PLMN(s) which may be required to be monitored for receiving the discovery information instead of monitoring all the PLMNs. Further, the UE determines the discovery resources configured in each of the PLMNs by searching a cell on a frequency corresponding to PLMN instead of searching cells on all frequencies, thereby reducing the battery power consumption.

Referring now to the drawings and more particularly to FIGS. 1 through 10 where similar reference characters denote corresponding features consistently throughout the figures, there are shown preferred embodiments.

Figure 1:
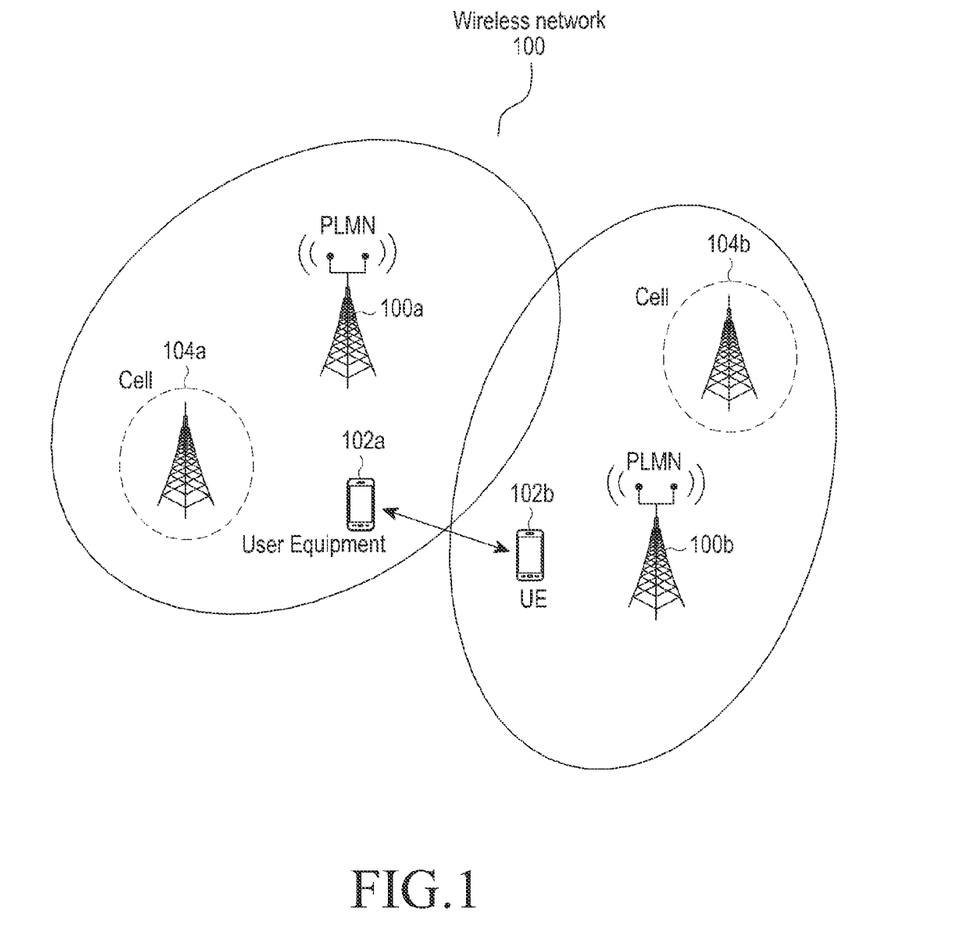
FIG. 1 illustrates a wireless network in which a user equipment (UE) performs inter Public Land Mobile Network (PLMN) discovery for Device to Device (D2D) communication, according to embodiments disclosed herein.

FIG. 1 illustrates a wireless network in which a user equipment (UE) performs inter Public Land Mobile Network (PLMN) discovery for Device to Device (D2D) communication, according to embodiments disclosed herein. As depicted in the FIG. 1, the wireless network 100 comprises two PLMNs such as PLMN 100*a* and PLMN 100*b*, a UE 102*a*, a UE 102*b*, a cell 104*a* serving the UE 102*a*, a cell 104*b* serving the UE 102*b*. The cell 104*a* is associated with the PLMN 100*a* and the cell 104*b* is associated with the PLMN 100*b* as shown in FIG. 1. The cell 104*a* is serving the UE 104*a* and is known as the serving cell of the UE 102*a*. The cell 104*b* is serving the UE 104*b* and is known as the serving cell of the UE 104*b*. The PLMN 100*a* is the PLMN (Home PLMN (HPLMN) or Visited PLMN (VPLMN)) of the UE 102*a* where UE 102*a* is registered and the PLMN 100*b* is the PLMN (HPLMN or VPLMN) of the UE 102*b* where UE 102*b* is registered.

The UE 102*a* is interested in monitoring discovery information transmitted by UE 102*b*. The UE 102*a* is in proximity to the UE 102*b*. When the UE 102*a* is in proximity to UE 102*b*, the UE 102*a* monitoring the discovery resources may receive the discovery information transmitted by the UE 102*b*. The UE 102*a* which is monitoring the discovery information from the UE 102*a* is known as monitoring UE. Further, the UE 102*b* which is transmitting the discovery information is known as transmitting UE.

Figure 2:
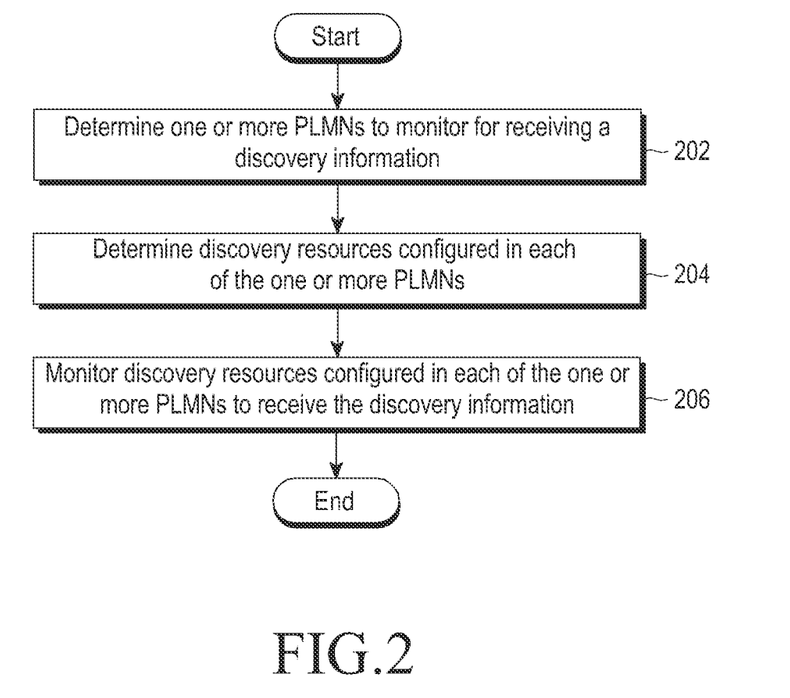
FIG. 2 illustrates a flow diagram for a method for performing inter PLMN discovery in D2D communication by the UE, according to embodiments disclosed herein.

FIG. 2 illustrates a flow diagram for a method 200 for performing inter PLMN discovery in D2D communication by the UE 102*a*, according to embodiments disclosed herein. The method 200 and other description described herein provide a basis for a control program, which can be implemented using a microcontroller, microprocessor, or any computer readable storage medium.

At step 202 the method 200 includes determining one or more PLMNs to monitor for receiving discovery information. The UE 102*a* determines one or more PLMNs which are to be monitored for receiving the discovery information. In an embodiment, the UE 102*a* sends a Discover Request message for monitoring discovery information to the D2D function in the HPLMN. The Discovery Request message includes D2D application ID(s), UE 102*a* identity, monitor command and Application ID. If the D2D Application ID indicates the same PLMN as HPLMN of UE 102*a*, then the D2D function in the HPLMN provides D2D Application ID code/mask corresponding to the Application ID and the one or more PLMNs (to be monitored for receiving the discovery information) in response to the Discovery Request message.

If the Application ID indicates another PLMN, the D2D function receives the one or more PLMNs from a D2D function of that PLMN. Further, the D2D function in the HPLMN of UE 102*a* sends the one or more PLMNs and the D2D Application ID code/mask to the UE 102*a* in the Discovery Response message.

In an embodiment, the one or more PLMNs to be monitored for receiving discovery information sent in discovery response message is a Registered PLMN (RPLMN) of the UE 102*b* which is transmitting the discovery information. The RPLMN of the UE 102*b* is the PLMN 100*b*.

In an embodiment, the one or more PLMNs to be monitored for receiving the discovery information are the PLMN(s) where the UE 102*b* transmitting the discovery information is authorized to announce. The one or more PLMNs where UE 102*b* transmitting the discovery information is authorized to announce includes at least the PLMN 100*b*.

In an embodiment, the one or more PLMNs to be monitored for receiving the discovery information are the PLMN(s) which are authorized to be monitored by the UE 102*a*. It is to be noted that these one or more PLMNs are not received by UE 102*a* in discovery response message. The list of PLMN(s) which are authorized to be monitored by the UE 102*a* are received by the UE 102*a* from D2D function during service authorization or may be provisioned in UICC of UE 102*a*.

In an embodiment, the one or more PLMNs to be monitored for receiving the discovery information are the PLMNs which are present not only in list of PLMNs where UE 102*b* transmitting the discovery information is authorized to announce but also present in list of PLMNs which are authorized to be monitored by the UE 102*a*. In an example, consider that the UE 102*b* is authorized for transmitting the discovery information in the PLMN A and PLMN B. Further, the UE 102*a* is authorized to monitor PLMN B and PLMN C for receiving the discovery information. In this case, the PLMN B is monitored by the UE 102*a* for receiving the discovery information, as the PLMN B is present in the PLMNs of the transmitting UE 102*b* and the UE 102*a* monitoring the discovery information.

In an embodiment, the one or more PLMNs to be monitored for receiving the discovery information are the PLMNs encoded in the D2D application ID or D2D application code corresponding to the discovery information to be monitored.

The determined one or more PLMNs to be monitored for receiving discovery information includes at least the PLMN 100*b*.

After the UE 102*a* determines the one or more PLMNs to be monitored for receiving discovery information, at step 204, the method 200 includes determining discovery resources configured in each of the one or more PLMNs. The UE 102*a* determines the discovery resources configured in each of the one or more PLMNs determined for monitoring the discovery information.

In an embodiment, the serving cell 104*a* signals in broadcast or dedicated signaling the discovery resources configured in the PLMN 100*a* and also neighbor PLMNs. The discovery resources configured in the cell 104*b* in the PLMN 100*b* is broadcasted by the serving cell 104*a* of the UE 102*a*. The serving cell 104*a* signals in broadcast or dedicated signaling, the discovery resources configured in the neighboring cells in the PLMN 100*a* and also the neighboring cells in the PLMN 100*b*.

In an embodiment, the PLMN information is included in the discovery resource information signaled by serving cell 104*a* to identify the discovery resources corresponding to a PLMN. The frequency information is also included in the discovery resource information signaled by serving cell 104*a* to identify the frequency to be monitored for the discovery resources corresponding to the PLMN. The UE 102*a* identifies the discovery resources configured in the PLMN 100*b* and corresponding frequency to be monitored from the discovery resource information signaled by serving cell 104*a* based on PLMN ID of the PLMN 100*b*.

The UE 102*a* monitors only the discovery resources corresponding to the PLMNs determined for monitoring the discovery information.

In an embodiment, the UE 102*a* receives a list of carrier frequencies along with information identifying the one or more PLMNs for each carrier frequency in System Information (SI) broadcasted by a serving cell 104*a*. Carrier frequency is identified by absolute radio-frequency channel number (ARFCN). In one embodiment, information identifying the PLMN corresponding to each carrier frequency is one of a PLMN identifier or a PLMN index. The PLMN index is the index of corresponding entry in PLMN Identity list included in system information (system information block (e.g. SIB 1) carrying PLMN identity list is different from system information block (e.g. SIB 19) carrying frequency list and mapping to PLMN). The UE 102*a* identifies the frequencies to be monitored corresponding to the PLMN 100*b* determined for monitoring discovery information from the list of frequencies along with information identifying the PLMN for each frequency received from the serving cell 104*a*. In one embodiment, UE 102*a* may also monitor other frequencies (corresponding to the determined PLMN for monitoring discovery information) not received in list of frequencies from the serving cell 104a, but the UE 102a prioritizes monitoring the frequency received in frequency list from serving cell. In an example, consider that the UE 102a is configured to monitor frequencies F1, F2, F3 and F4. If the serving cell 104a broadcasts the list of frequencies F3 and F4, then the UE 102a prioritizes the frequencies F3 and F4 that are present in the received list from the serving cell 104a. Further, the UE 102a monitors the frequencies F1 and F2 after monitoring the frequencies F3 and F4.

The UE 102a periodically tunes to the frequencies of the determined PLMNs to be monitored to find a cell. If the cell is found then, the UE 102a reads SI broadcasted by the found cell. In an embodiment, if multiple cells are found then, the UE 102a may select the cell with best signal quality. In an embodiment, the UE 102a may select any cell from the multiple cells. In the SI broadcasted by the found cell, the UE 102a determines discovery resources configured in the cell. When the UE 102a is tuned to the frequency of PLMN 100b and identifies a neighboring cell in the PLMN 100b, the UE 102a reads System Information (SI) from the neighboring cell. In the SI broadcasted by the neighboring cell, the UE 102a determines discovery resources configured in the neighboring cell in the PLMN 100b.

At step 206, the method 200 includes monitoring discovery resources configured in the one or more PLMNs to receive the discovery information. The UE 102a monitors discovery resources configured in the one or more PLMNs determined to receive the discovery information.

In an embodiment, the UE 102a monitors the discovery resources configured in the neighboring cell belonging to the same PLMN, i.e., the PLMN 100a or the neighboring cell in the PLMN 100b during Discontinuous Reception (DRX) without additional receiver chain. The UE 102a prioritizes communication with the serving cell 104a over monitoring the discovery resources. In an embodiment, the UE 102a monitors the discovery resources configured in the neighboring cell belonging to the same PLMN, i.e., the PLMN 100a or the neighboring cell in the PLMN 100b using additional receiver chain.

In an embodiment, the UE 102a sends a request to the serving cell 104a. The request includes the PLMNs and/or frequencies to be monitored by the UE 102a. The base station (eNB) of the UE 102a provides gaps for the UE 102a for monitoring the PLMNs along with resource configuration of the PLMNs (which the UE 102a is interested to monitor) in a dedicated message.

In an embodiment, the UE 102a sends a request to the serving cell 104a. The request includes the PLMNs and/or frequencies to be monitored by the UE 102a. The base station (eNB) of the UE 102a provides gaps for the UE 102a for monitoring the PLMNs. The gaps denote the sub frames or time slots in which the eNB will not schedule uplink (UL) and/or downlink (DL) transmission to the UE 102a. The eNB configures long DRX cycles to the UE in case the gaps are not provided to the UE 102a for monitoring. The UE 102a obtains the resource configuration in the PLMNs by tuning to the frequencies of the PLMNs broadcasted by the serving cell 104a.

In an embodiment, the UE 102a sends a request to the serving cell 104a. The request includes the information about the gaps (e.g. sub frames, where gaps are needed), PLMNs and/or frequencies to be monitored by the UE 102a. The eNB of the UE 102a provides gaps for the UE 102a for monitoring the PLMNs.

In an embodiment, the UE 102a monitors the PLMNs/frequencies autonomously during DRX. The UE 102a tunes to those frequencies, reads the SI, and monitors discovery resources.

The various actions, acts, blocks, steps, and the like in the method 200 may be performed in the order presented, in a different order or simultaneously. Further, in some embodiments, some actions, acts, blocks, steps, and the like may be omitted, added, modified, skipped, and the like without departing from scope of the present disclosure.

Figure 3:
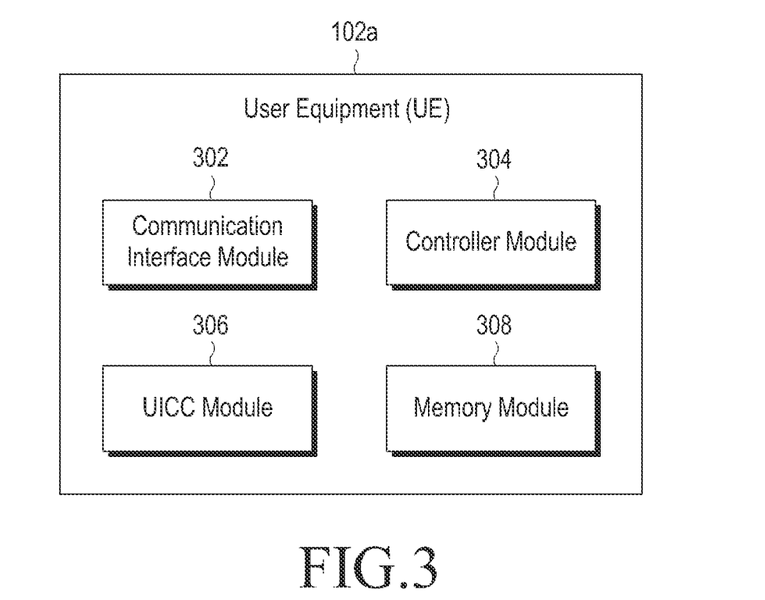
FIG. 3 illustrates a block diagram of the UE configured for performing the inter-PLMN discovery, according to embodiments disclosed herein.

FIG. 3 illustrates a block diagram of the UE 102a configured for performing the inter-PLMN discovery, according to embodiments disclosed herein. As depicted in the FIG. 3, the UE 102a includes a communication interface module 302, a controller module 304, a Universal Integrated Circuit Card (UICC) module 306 and a memory module 308. The communication interface module 302 helps the UE 102a to connect to the wireless network 100.

In an embodiment, the controller module 304 can be configured to perform one or more actions for monitoring the one or more PLMNs to receive the discovery information.

In an embodiment, the controller module 304 can be configured to determine one or more PLMNs to monitor for receiving the discovery information. In an embodiment, the controller module 304 can be configured to receive one or more PLMNs from the D2D function in the HPLMN for monitoring to receive the discovery information.

In an embodiment, the controller module 304 can be configured to determine discovery resources configured in each of the one or more PLMNs.

In an embodiment, the controller module 304 can be configured to monitor discovery resources configured in the one or more PLMNs for receiving the discovery information.

The UICC module 306 enables the communication between the UE 102a and the PLMN 100a through the communication interface module 302. The UICC module 206 is a smart card in UE 102a which is referred as a Subscriber Identity Module (SIM) in second Generation (2G) context and also referred as Universal SIM (USIM) in third Generation (3G) context. The UICC module 306 includes a memory that may store information and instructions. In an embodiment, the UICC module 306 can be configured store the PLMN(s) (default list of PLMNs) to be monitored for receiving the discovery information.

In an embodiment, the UICC module 306 can be configured to store the PLMNs which the UE 102a is authorized to monitor. The PLMNs stored in the UICC module 306 are determined by the UE 102a during service authorization with the D2D function 106a in the PLMN 100a.

The memory module 308 may include a random access memory (RAM) or another type of storage such as a flash memory that may store information and instructions, for example an application, for execution by processor, a read-only memory (ROM) device or another type of static storage device.

In an embodiment, the PLMN IDs of the PLMNs and corresponding frequency of the neighboring cells which are received from the serving cell 104a of the UE 102a is stored in the memory module 308.

Figure 4:
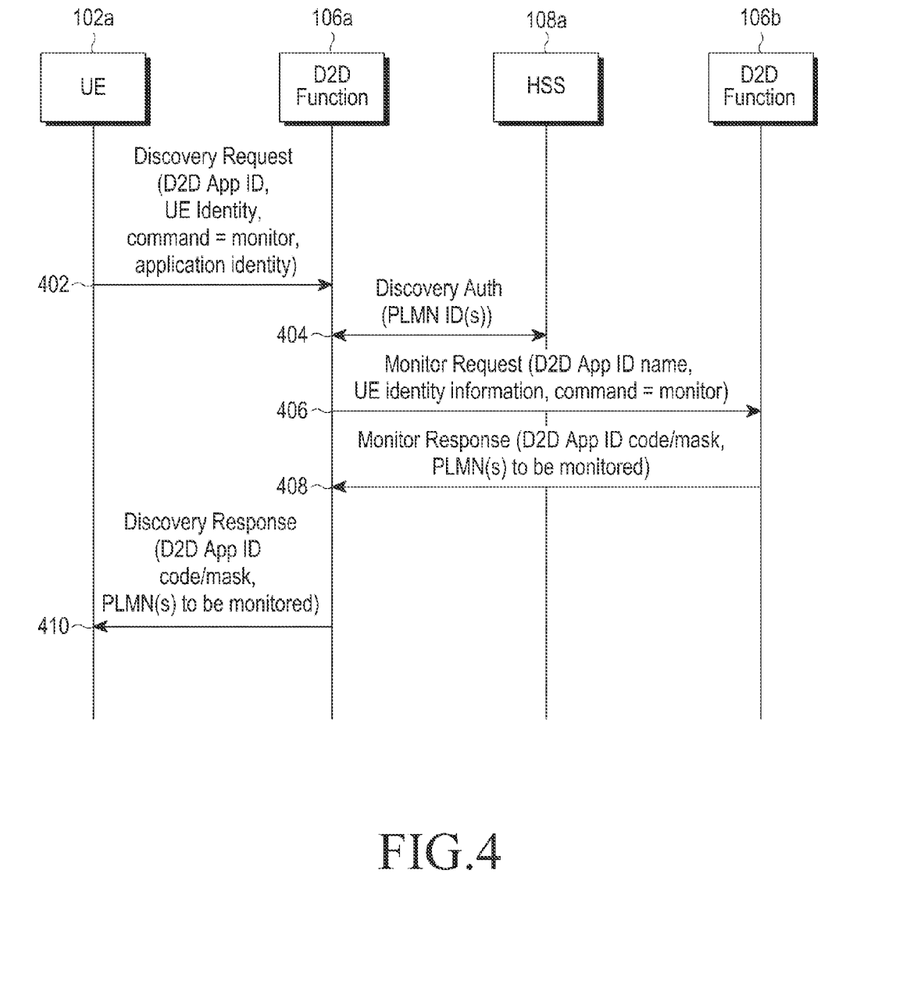
FIG. 4 illustrates a sequence diagram in which the UE receives one or more PLMNs to be monitored from a D2D function, according to embodiments disclosed herein.

FIG. 4 illustrates a sequence diagram in which the UE 102a receives one or more PLMNs to be monitored from a D2D function, according to embodiments disclosed herein.

The UE 102a which is monitoring the discovery information is aware of the D2D Application ID, which the UE 102a is interested to monitor. In an embodiment, the D2D application ID may be PLMN specific or country specific or globally unique.

If the UE 102a is authorized to monitor one or more PLMNs and the UE 102a is interested to monitor certain D2D Application ID(s), the UE 102a establishes a secure connection with the D2D function 106a in the HPLMN. The UE 102a sends (402) a Discovery Request message to the D2D function 106a in the HPLMN. The Discovery Request message includes D2D Application ID(s), UE Identity, monitor command, Application ID for monitoring.

The D2D Application ID(s) in the Discovery Request message indicate the IDs which the UE 102a is interested to monitor. The Identity of the UE 102a is set to International Mobile Subscriber Identity (IMSI). The Application ID represents a unique identifier of the application which has triggered the transmission of the Discovery Request message.

The D2D function 106a verifies authorization of an application represented by the Application ID. If there exists no associated UE context, the D2D Function 106a checks (404), the authorization for discovery and creates a new context for the UE 102a with the HSS 108a that contains the subscription parameters of the UE 102a. The HSS 108a provides the MSISDN of the UE 102a. The authorization information also contains the one or more PLMNs that the UE 102a is allowed to monitor the discovery information.

If the Discovery Request message is authorized, and the D2D Application ID sent by the UE in step 402 indicates a different PLMN (other than HPLMN of UE 102a) then, the D2D function 106a requests the D2D function 106b associated with the PLMN that is indicated by the D2D Application ID sent by the UE 102a, in order to resolve the corresponding D2D Application ID Name to D2D Application Code and/or a D2D Application mask. The D2D function 106a sends (406) a monitoring request including D2D Application ID Name and UE identity information to the D2D function 106b.

If the D2D function 106b stores valid D2D Application Code corresponding to the requested D2D Application ID name, then the D2D function 106b (408) sends the related D2D Application Code and/or D2D Application Mask and the corresponding TTL for each.

The D2D function 106b also sends the information of the one or more PLMNs to be monitored for the D2D application code.

Figure 5:
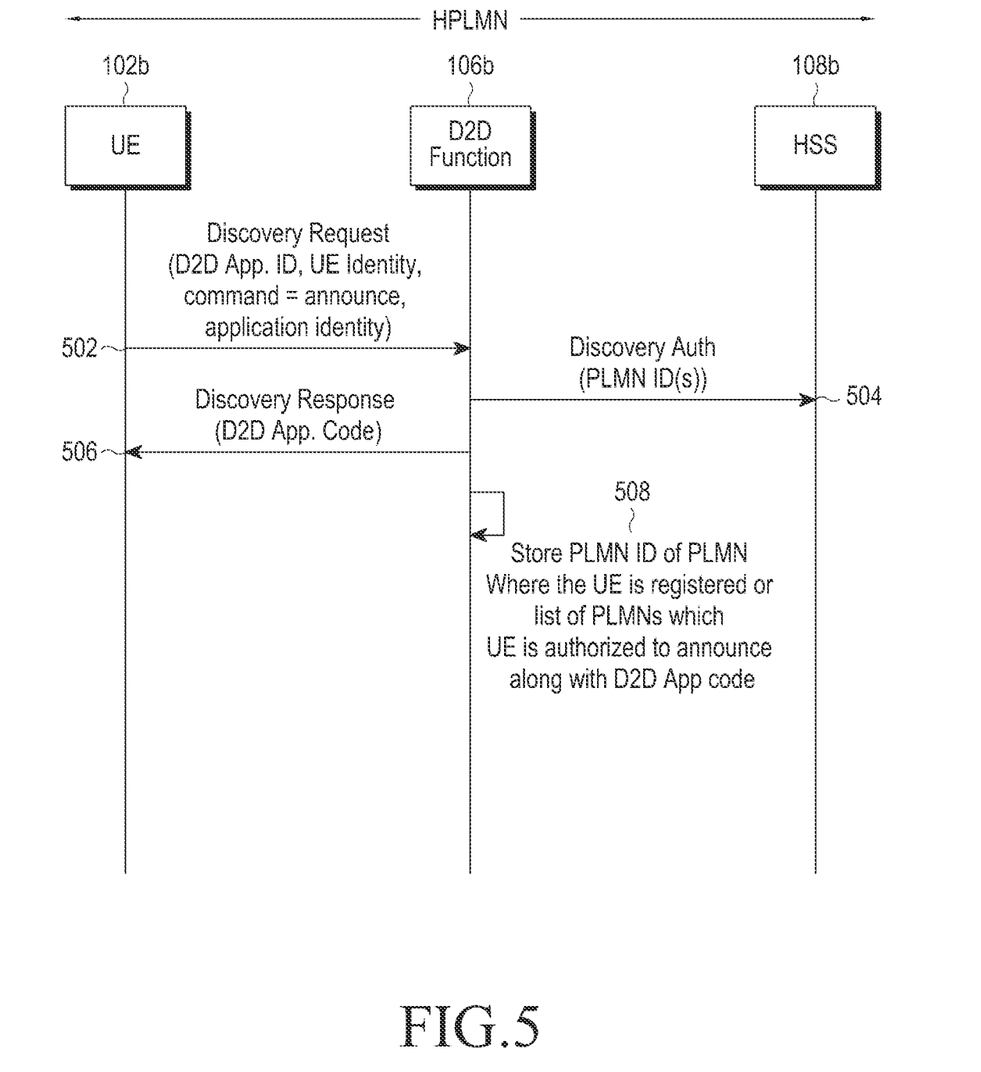
FIG. 5 illustrates a sequence diagram in which the D2D function obtains information about registered and/or authorized PLMN(s) of the UE transmitting the discovery information, according to embodiments disclosed herein.
Figure 6:
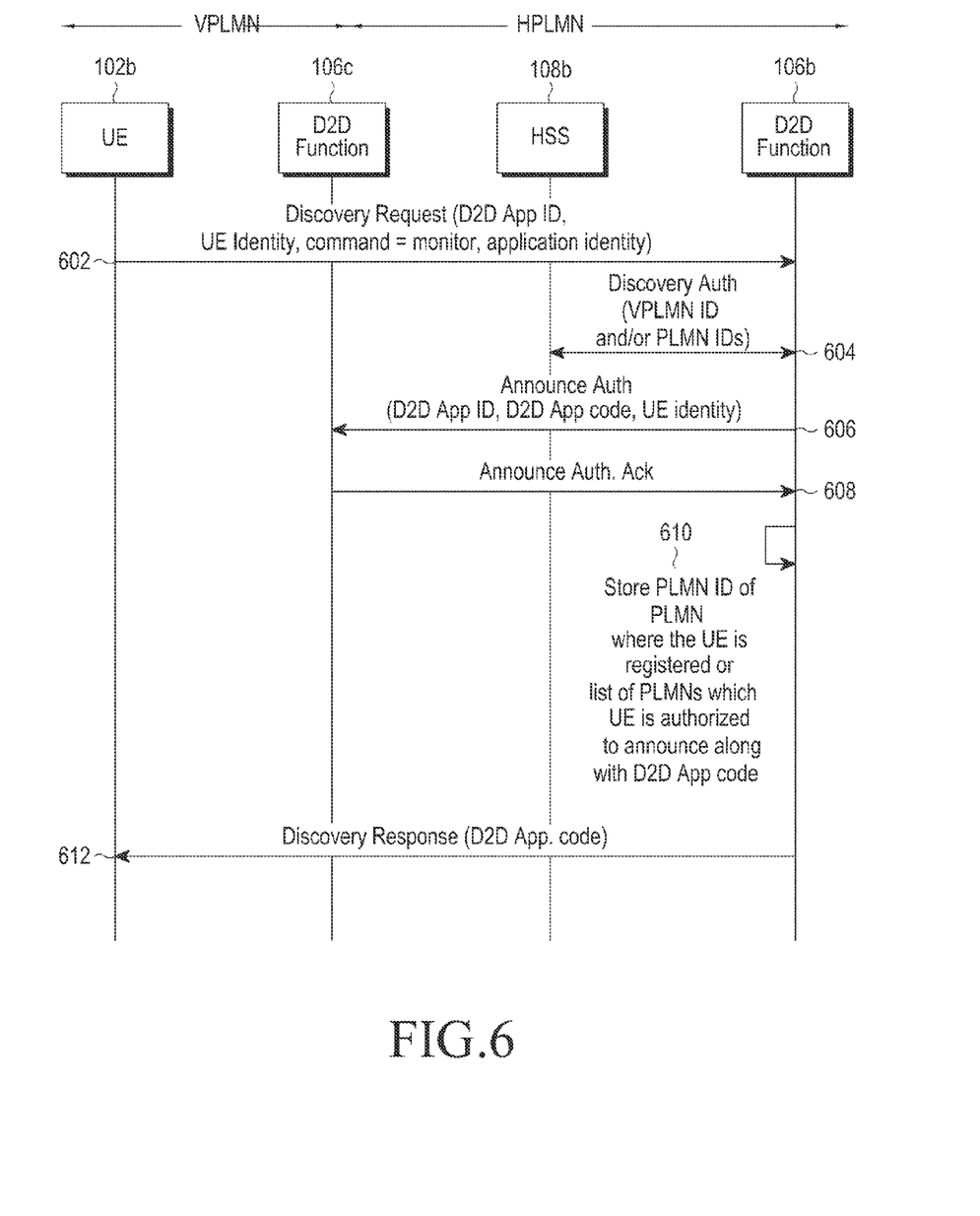
FIG. 6 illustrates another sequence diagram in which the D2D function obtains information about registered and/or authorized PLMN(s) of the UE transmitting the discovery information, according to embodiments disclosed herein.

In an embodiment, the one or more PLMNs to be monitored sent by the D2D function 106b is the registered PLMN ID of the UE 102b announcing the D2D application code, D2D function obtains information about the registered PLMN of the UE 102b announcing the D2D application code using the operation illustrated in FIG. 5 and FIG. 6.

In an embodiment the one or more PLMNs to be monitored sent by the D2D function 106b is the one or more PLMNs where the UE 102b announcing the D2D application code is authorized to announce.

The D2D function 106a in the HPLMN sends (410) a Discovery Response message which includes D2D Application Code and/or D2D Application Mask and PLMN IDs of the one or more PLMNs to be monitored for the D2D application code in response to the Discovery Request message.

In an embodiment, the PLMNs to be monitored sent by the D2D function 106a is same as those received from D2D function 106b.

In an embodiment the one or more PLMNs to be monitored sent by the D2D function 106a are the PLMNs which are present not only in list of PLMNs received from D2D function 106b but also present in list of PLMNs which are authorized to be monitored by the UE 102a.

If the Discovery Request message is authorized, and the D2D Application ID sent by the UE in step 402 indicates a same PLMN as HPLMN of UE 102a then, if the D2D function 106a stores valid D2D Application Code corresponding to the requested D2D Application ID name, then the D2D function 106a (410) sends the discovery response message that includes the related D2D Application Code and/or D2D Application Mask and the corresponding TTL for each.

The D2D function 106a also sends the information of the one or more PLMNs to be monitored for the D2D application code.

In an embodiment, the one or more PLMNs to be monitored sent by the D2D function 106a is the registered PLMN ID of the UE 102b announcing the D2D application code. The D2D function 106a obtains information about the registered PLMN of the UE 102b announcing the D2D application code using the operation illustrated in the FIGS. 5 and 6.

In an embodiment the one or more PLMNs to be monitored that are sent by the D2D function 106a are the one or more PLMNs where the UE 102b announcing the D2D application code is authorized to announce.

In an embodiment the one or more PLMNs to be monitored that are sent by the D2D function 106a are the one or more PLMNs which are present not only in list of PLMNs where UE 102b is authorized to announce but also present in list of PLMNs which are authorized to be monitored by the UE 102a.

FIG. 5 illustrates a sequence diagram in which the D2D function obtains information about registered and/or authorized PLMN(s) of the UE transmitting the discovery information, according to embodiments disclosed herein. The UE transmitting the discovery information is registered in HPLMN.

If the UE 102b is authorized to announce in the HPLMN and is triggered to announce, the UE 102b establishes a secure connection with the D2D function 106b and sends (502) the Discovery Request message that includes D2D Application ID, UE Identity, announce command, Application ID to the D2D function 106b for transmitting the discovery information. The D2D Application ID indicates the IDs that the UE is interested to announce. The UE Identity is set to IMSI. The Application ID represents a unique identifier of the UE application that has triggered the transmission of the Discovery Request message. The Discovery Request message request is sent to the D2D function 106b in the HPLMN.

The D2D function 106b checks for the authorization of the application represented by the Application ID. If there is no associated UE context, the D2D function 106b checks (504) the authorization for discovery and creates a new context for the UE 102b with the HSS 108b that contains the subscription parameters for the UE 102b. The HSS 108b provides the MSISDN of the UE 102b. The HSS 108b also provides one or more PLMN(s) where the UE 102b is authorized to announce or transmit the discovery information.

If the Discovery Request is authorized, then the D2D function 106b sends (506) a Discovery Response (D2D Application Code) message. The D2D Application code is provided by the D2D function 106b, which corresponds to the D2D Application ID present in the Discovery Request. The D2D function 106b stores (508) the PLMN ID where the UE 102b is registered along with D2D Application code. The D2D function 106b also stores the PLMN ID(s) of PLMN(s) where the UE is authorized to announce along with D2D Application code. In this case, PLMN ID is the PLMN of the D2D function 106b. When the UE 102b changes the UE's 102b registered PLMN, the UE 102b needs to request a new D2D Application Code.

FIG. 6 illustrates another sequence diagram in which the D2D function 106b obtains information about registered and/or authorized PLMN(s) of the UE transmitting the discovery information, according to embodiments disclosed herein.

In an embodiment, the D2D function 106b can obtain the information about the registered PLMN ID of the UE 102b announcing the discovery information as illustrated in the FIG. 6. In the FIG. 6, the UE 102b which is transmitting the discovery information is registered in the VPLMN. When the UE 102b is in the VPLMN, the UE 102b sends (602) the Discovery Request message that includes D2D Application ID, UE Identity, announce command, Application ID to the D2D function 106b in HPLMN for transmitting the discovery information.

The D2D function 106 b checks for the authorization of the application represented by the Application ID. If there is no associated UE context, the D2D function 106b checks (604), the authorization for discovery and creates a new context for the UE 102b with the HSS 108b that contains the subscription parameters for the UE 102b. The HSS 108b provides the MSISDN of the UE 102b. The HSS 108b also provides the VPLMN ID and one or more PLMN ID(s) where the UE 102b is authorized to announce or transmit the discovery information.

The D2D function 106b sends (606) the related D2D Application code and the UE 102b identity corresponding to the Application ID sent in the Discovery Request message to the D2D function 106c. The D2D Application code denotes the code that the UE 102b is authorized to announce or transmit in the discovery information.

The D2D function 106c sends (608) an acknowledgement to the D2D function 106b after receiving the D2D Application code from the D2D function 106b. The D2D function 106b stores (610) the PLMN ID of the PLMN where the UE 102b is registered and/or the one or more PLMNs which the UE 102b is authorized to announce along with the D2D Application code.

Further, the D2D function 106b sends (612) the D2D Application code to the UE 102b in the Discovery Response message.

Figure 7:
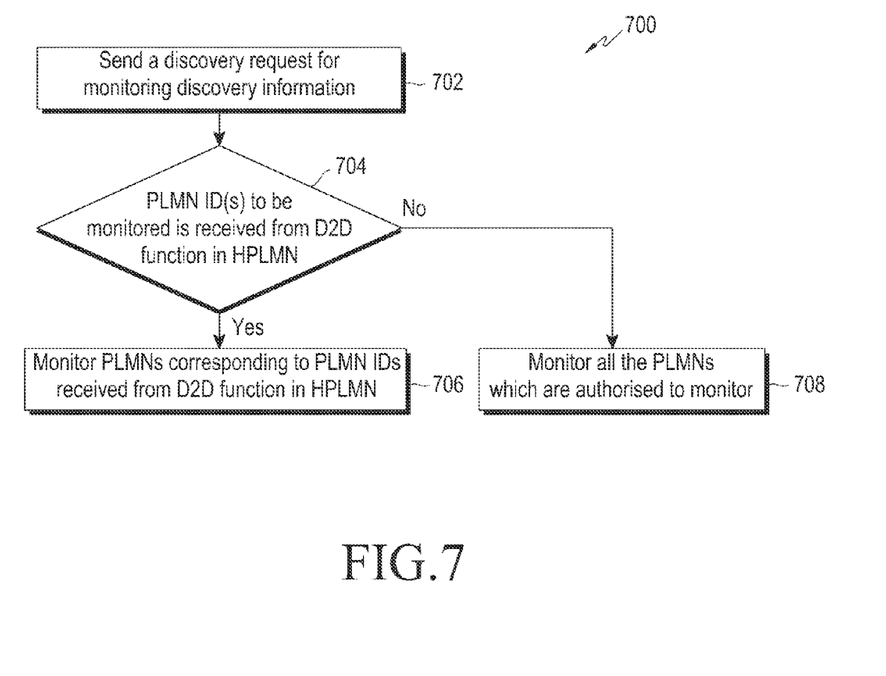
FIG. 7 illustrates a flow diagram for a method for determining the one or more PLMNs to be monitored for receiving the discovery information, according to embodiments disclosed herein.

FIG. 7 illustrates a flow diagram for a method 700 for determining the one or more PLMNs to be monitored for receiving the discovery information, according to embodiments disclosed herein. The method 700 and other description described herein provide a basis for a control program, which can be implemented using a microcontroller, microprocessor, or any computer readable storage medium.

At step 702, the method 700 includes sending the discovery request for monitoring discovery information. The method 700 allows the controller module 304 to send the discovery request for monitoring discovery information. The UE 102a sends the discovery request for monitoring the discovery information (for example, D2D App ID) to the D2D function 106a in HPLMN and receives the discovery response with the D2D discovery code to monitor. The detailed procedure is illustrated in the FIG. 4 and described earlier and hence omitted here.

At step 704, the method 700 includes determining whether the PLMN ID(s) to be monitored is received from the D2D function 106a in the HPLMN. The method 800 allows the controller module 304 to determine whether the PLMN ID(s) to be monitored is received from the D2D function 106a in the HPLMN. If at step 804, it is determined that the PLMN ID(s) to be monitored is received from the D2D function 106a in the HPLMN, then at step 706, the method 700 includes monitoring PLMNs corresponding to the PLMN IDs received from the D2D function 106a in the HPLMN. The PLMNs corresponding to PLMN IDs received from D2D function 106a in HPLMN are monitored for receiving the discovery information. The method 800 allows the controller module 304 to monitor PLMNs corresponding to PLMN IDs received from D2D function 106a in HPLMN for receiving the discovery information.

If at step 704, it is determined that the PLMN ID(s) to be monitored is not received from the D2D function 106a in HPLMN, then at step 708, the method 700 includes monitoring all the PLMNs which the UE 102a authorized to monitor. The method 700 allows the controller module 304 to monitor all the PLMNs which the UE 102a is authorized to monitor. The list of PLMN(s) which are authorized to be monitored by the UE 102a are received by the UE 102a from D2D function 106a during service authorization or may be provisioned in UICC module 306 of the UE 102a.

The various actions, acts, blocks, steps, and the like in the method 700 may be performed in the order presented, in a different order or simultaneously. Further, in some embodiments, some actions, acts, blocks, steps, and the like may be omitted, added, modified, skipped, and the like without departing from scope of the present disclosure.

Figure 8:
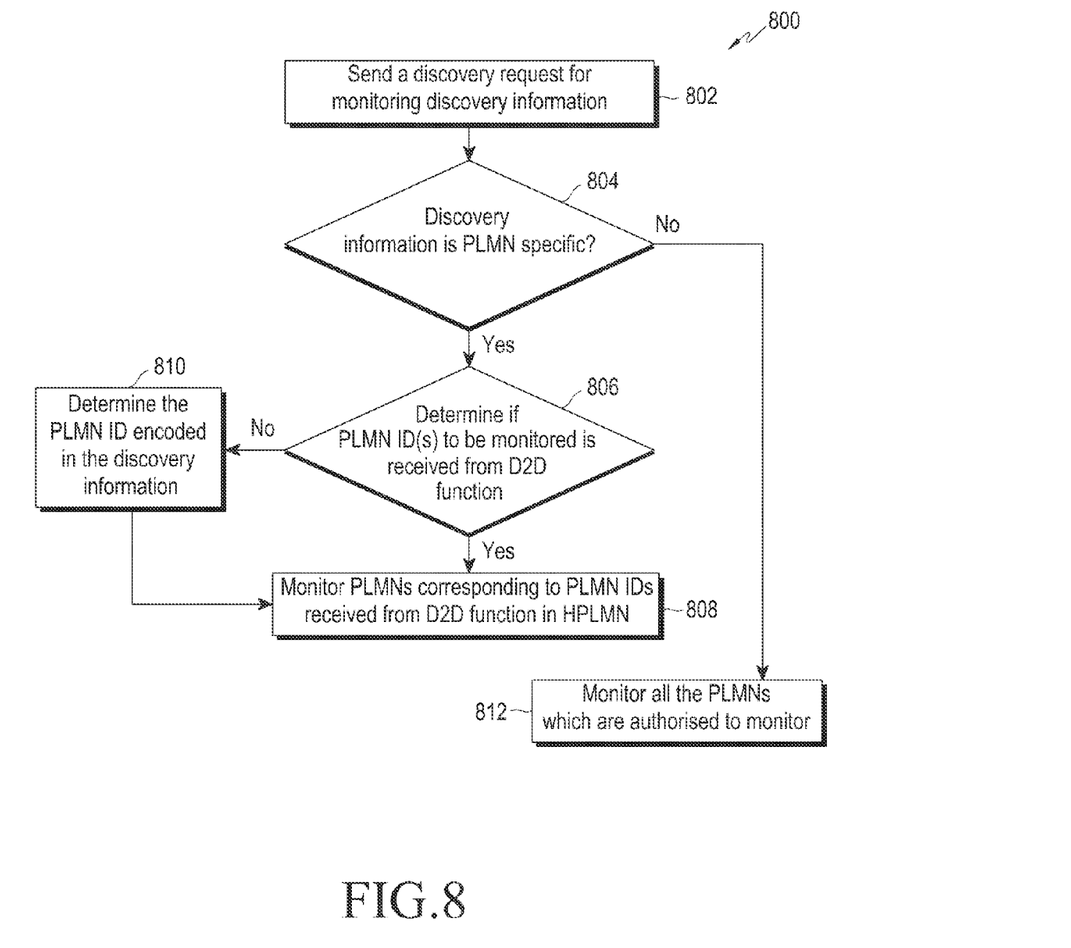
FIG. 8 illustrates a flow diagram for another method for determining the one or more PLMNs to be monitored for receiving the discovery information, according to embodiments disclosed herein.

FIG. 8 illustrates a flow diagram for another method 800 for determining the one or more PLMNs to be monitored for receiving the discovery information, according to embodiments disclosed herein. The method 800 and other description described herein provide a basis for a control program, which can be implemented using a microcontroller, microprocessor, or any computer readable storage medium.

At step 802, the method 802 includes sending the discovery request for monitoring the discovery information. The UE 102a sends the discovery request for monitoring the discovery information (e.g. D2D App ID) to D2D function 106a in HPLMN and receives discovery response with a D2D discovery code to monitor. The method 800 allows the controller module 304 to send the discovery request for monitoring the discovery information. The detailed procedure is illustrated in the FIG. 4 and described earlier and hence omitted here.

At step 804, the method 800 includes determining whether the discovery information is PLMN specific. The method 800 allows the controller module 304 to determine whether the discovery information is PLMN specific. The UE 102a determines whether the discovery information to be monitored is PLMN specific or not. The UE 102a ignores the step 804 when the discovery information is always PLMN specific or never PLMN specific.

If it is determined that the discovery information is PLMN specific, then at step 806, the method 800 includes determining if the PLMN ID(s) to be monitored is received from the D2D function 106a in the HPLMN. The method 800 allows the controller module 304 to determine if the PLMN ID(s) to be monitored is received from the D2D function 106a in then HPLMN. If it is determined that the PLMN ID(s) to be monitored is received from the D2D function 106a, then at step 808, the method 800 includes monitoring the PLMNs corresponding to PLMN IDs received from D2D function 106a in the HPLMN. The PLMNs corresponding to PLMN IDs received from D2D function 106a in HPLMN are monitored for receiving the discovery information. The method 800 allows the controller module 304 to monitor the PLMNs corresponding to PLMN IDs received from D2D function 106a in the HPLMN for receiving the discovery information.

If it is determined that the PLMN ID(s) to be monitored is not received from the D2D function 106a in the HPLMN, then at step 810, the method 800 includes determining the PLMN ID encoded in the discovery information. The method 800 allows the controller module 304 to determine the PLMN ID encoded in the discovery information. After determining the PLMN ID encoded in the discovery information, at step 808, the PLMN corresponding to PLMN ID is monitored for receiving the discovery information.

If at step 804, it is determined that the discovery information is not PLMN specific, then at step 812, the method 800 includes monitoring all the PLMNs which UE 102a is authorized to monitor. The method 800 allows the controller module 304 to monitor all the PLMNs which UE 102a is authorized to monitor. The list of PLMN(s) which are authorized to be monitored by the UE 102a are received by the UE 102a from the D2D function 106a during service authorization or may be provisioned in UICC module 306 of the UE 102a.

The various actions, acts, blocks, steps, and the like in the method 800 may be performed in the order presented, in a different order or simultaneously. Further, in some embodiments, some actions, acts, blocks, steps, and the like may be omitted, added, modified, skipped, and the like without departing from scope of the present disclosure.

Figure 9:
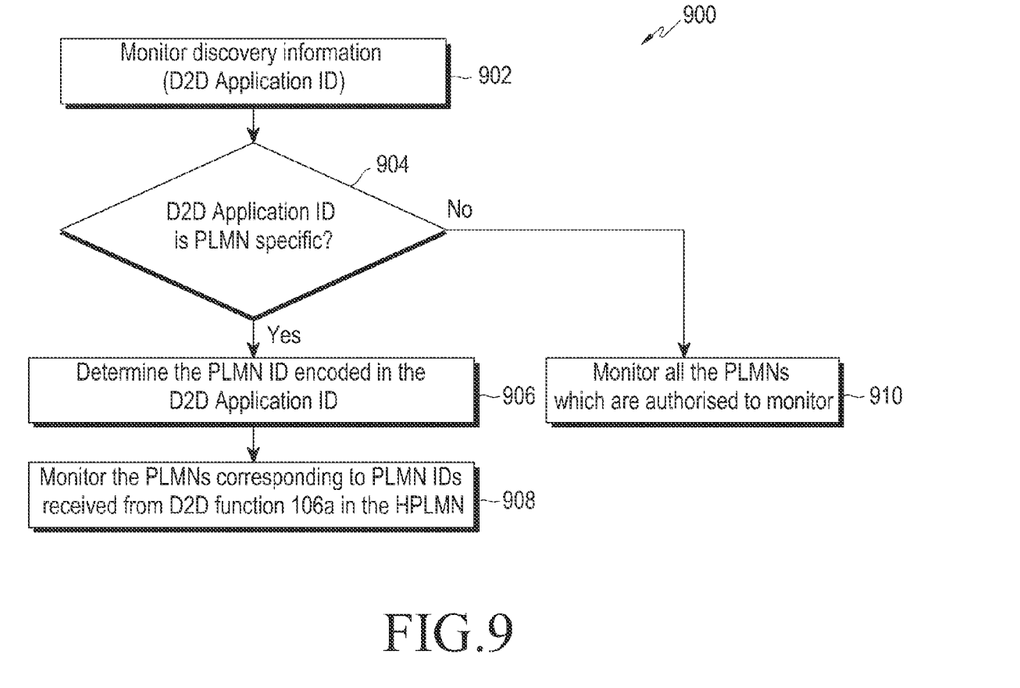
FIG. 9 illustrates a flow diagram for another method for determining the one or more PLMNs to be monitored for receiving the discovery information, according to embodiments disclosed herein.

FIG. 9 illustrates a flow diagram for another method 900 for determining the one or more PLMNs to be monitored for receiving the discovery information, according to embodiments disclosed herein. The method 900 and other description described herein provide a basis for a control program, which can be implemented using a microcontroller, microprocessor, or any computer readable storage medium.

At step 902, the method 900 includes monitoring discovery information (D2D Application ID). The method 900 allows the controller module 304 to monitor the discovery information.

At step 904, the method 900 includes determining whether the D2D application ID is PLMN specific. The method 1000 allows the controller module 304 to determine whether the D2D application ID is PLMN specific.

If at step 904, it is determined that the D2D application ID is PLMN specific, then at step 906, the method 900 includes determining the PLMN ID encoded in the D2D Application ID. The method 900 allows the controller module 304 to determine that the D2D application ID is PLMN specific.

At step 908, the method 900 includes monitoring the PLMNs corresponding to PLMN IDs received from D2D function 106a in the HPLMN. The PLMNs corresponding to PLMN ID is monitored for receiving the discovery information. The method 900 allows the controller module 904 to monitor the PLMNs corresponding to PLMN ID for receiving the discovery information.

If at step 904, it is determined that the D2D application ID is not PLMN specific, then at step 910, the method 900 includes monitoring all the PLMNs which UE 102a is authorized to monitor. The method 900 allows the controller module 304 to monitor the PLMN(s) which UE 102a is authorized to monitor. The list of PLMN(s) which are authorized to be monitored by the UE 102a are received by the UE 102a from the D2D function 106a during service authorization or may be provisioned in UICC module 306 of UE 102a.

In an embodiment, the UE 102a monitors the PLMN(s) which the UE 102a is authorized to monitor. The list of PLMN(s) which are authorized to be monitored by the UE 102a are received by the UE 102a from the D2D function 106a during service authorization or may be provisioned in the UICC module 306 of the UE 102a.

The various actions, acts, blocks, steps, and the like in the method 900 may be performed in the order presented, in a different order or simultaneously. Further, in some embodiments, some actions, acts, blocks, steps, and the like may be omitted, added, modified, skipped, and the like without departing from scope of the present disclosure.

Figure 10:
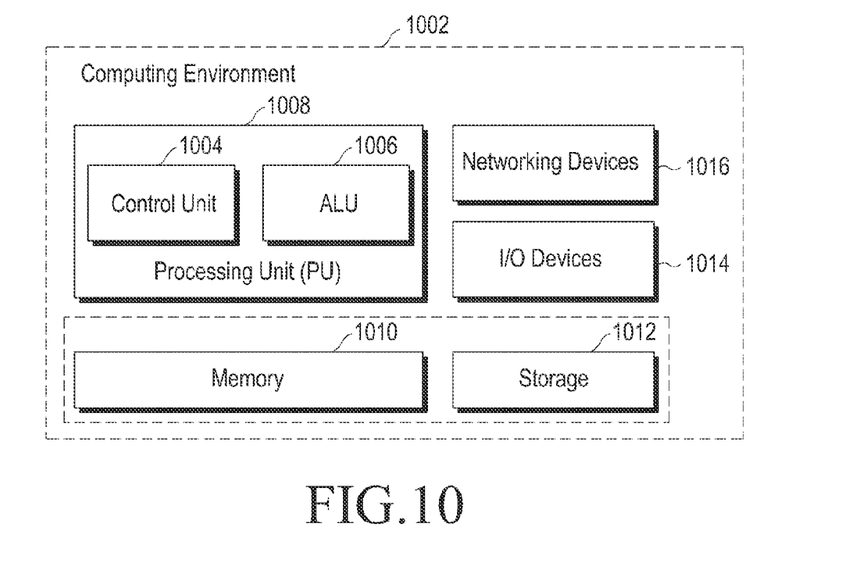
FIG. 10 illustrates a computing environment implementing the method and system for the inter PLMN discovery by the UE, in D2D communication, according to embodiments disclosed herein.

FIG. 10 illustrates a computing environment implementing the method and system for the inter PLMN discovery by the UE, in D2D communication, according to embodiments disclosed herein. As depicted the computing environment 1002 comprises at least one processing unit 1008 that is equipped with a control unit 1004 and an Arithmetic Logic Unit (ALU) 1006, a memory 1010, a storage unit 1012, plurality of networking devices 1016 and a plurality Input output (I/O) devices 1014. The processing unit 1008 is responsible for processing the instructions of the algorithm. The processing unit 1008 receives commands from the control unit in order to perform processing unit 1008 processing. Further, any logical and arithmetic operations involved in the execution of the instructions are computed with the help of the ALU 1006

The overall computing environment 1002 can be composed of multiple homogeneous and/or heterogeneous cores, multiple CPUs of different kinds, special media and other accelerators. The processing unit 1008 is responsible for processing the instructions of the algorithm. Further, the plurality of processing units 1008 may be located on a single chip or over multiple chips.

The algorithm comprising of instructions and codes used for the implementation are stored in either the memory unit 1010 or the storage 1012 or both. At the time of execution, the instructions may be fetched from the corresponding memory 1010 and/or storage 1012, and executed by the processing unit 1008.

In case of any hardware implementations various networking devices 1016 or external I/O devices 1014 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 3, 4, 5, 6 and 10 include blocks which can be at least one of a hardware device, or a combination of hardware device and software module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for monitoring a discovery message, by a user equipment (UE), the method comprising:
receiving first information including a list of frequencies and public land mobile network (PLMN) identifiers (IDs) from a serving cell;
receiving second information through at least one frequency of the list of frequencies for monitoring a discovery message on the at least one frequency;

identifying discovery configuration in the second information; and monitoring the discovery message based on the discovery configuration.

2. The method of claim 1, wherein the first information is received from a device to device (D2D) function in a home PLMN (HPLMN) in response to a discovery monitoring request.

3. The method of claim 1, further comprising: receiving authorization information for monitoring the discovery message.

4. The method of claim 3, wherein the authorization information comprises a list of PLMNs in which the UE is authorized for monitoring the discovery message.

5. The method of claim 3, wherein the authorization information is received from a device to device (D2D) function in a home PLMN (HPLMN).

6. The method of claim 1, wherein the at least one frequency is discovery resources configured in each of at least one PLMN.

7. The method of claim 1, wherein the first information is signaled by the serving cell of the UE in dedicated signaling.

8. The method of claim 1, wherein the UE monitors the discovery message during a discontinuous reception (DRX) mode.

9. The method of claim 1, wherein the first information is broadcast in a system information block (SIB).

10. A user equipment (UE) for monitoring a discovery message, the UE comprising:

a receiver configured to:

receive first information including a list of frequencies and public land mobile network (PLMN) identifiers (IDs) from a serving cell; and receive second information through at least one frequency of the list of frequencies for monitoring a discovery message on the at least one frequency; and a controller configured to:

identify discovery configuration in the second information; and monitor the discovery message based on the discovery configuration.

11. The UE of claim 10, wherein the first information is received from a device to device (D2D) function in a home PLMN (HPLMN) in response to a discovery message monitoring request.

12. The UE of claim 10, wherein the receiver is further configured to receive authorization information for monitoring the discovery message.

13. The UE of claim 12, wherein the authorization information comprises a list of PLMNs in which the UE is authorized for monitoring the discovery message.

14. The UE of claim 12, wherein the authorization information is received from a device to device (D2D) function in a home PLMN (HPLMN).

15. The UE of claim 10, wherein the at least one frequency is discovery resources configured in each of at least one PLMN.

16. The UE of claim 10, wherein the first information is signaled by the serving cell of the UE in dedicated signaling.

17. The UE of claim 10, wherein the controller is configured to monitor the discovery message during a discontinuous reception (DRX) mode.

18. The UE of claim 10, wherein the first information is broadcast in a system information block (SIB).

* * * * *